Jan. 19, 1960

C. O. MERCHANT 2,921,478

INDEXING MACHINE

Filed Oct. 29, 1954

INVENTOR.
CHESTER O. MERCHANT

BY Charles L. Lowercheck

ATTORNEY

Jan. 19, 1960     C. O. MERCHANT     2,921,478
INDEXING MACHINE
Filed Oct. 29, 1954                2 Sheets-Sheet 2
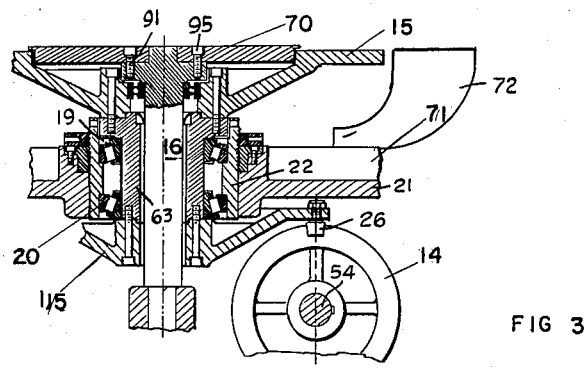
FIG 3
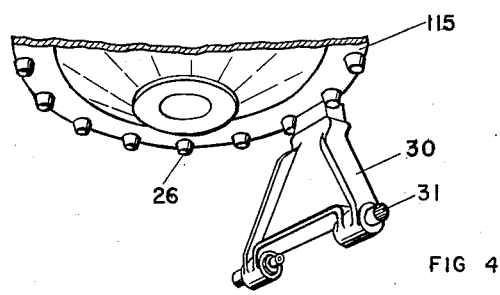
FIG 4
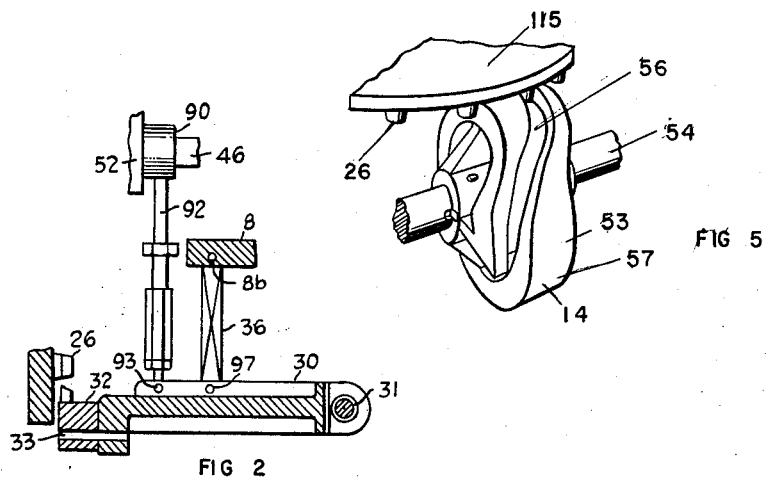
FIG 5
FIG 2
INVENTOR.
Chester O. Merchant
BY Charles L. Lovercheck
atty

United States Patent Office 2,921,478
Patented Jan. 19, 1960

2,921,478

INDEXING MACHINE

Chester O. Merchant, Harborcreek, Pa., assignor to Swanson Tool & Machine Products, Inc., Erie, Pa., a corporation of Pennsylvania Application October 29, 1954, Serial No. 465,707

1 Claim. (Cl. 74—112)

This invention relates to indexing devices and more particularly to a standard turret unit for multiple indexing applications.

The indexing unit is made up of an index plate with a calculated number of radially mounted cam followers. The spacing between each cam follower and an adjacent follower is exactly equal to the axial thickness of the cam face. The cross over cam actuating the index plate gives desired indexing and dwell. A stationary center plate is provided for mounting tools in the center and the turret driven by the indexing cam rotates around the center plate. A fixed radial base unit is mounted outside of the rotating plate on which tools can be held as well as on the center plate. Further, a wedge lock actuated by the indexing mechanism drive securely and positively locks the index plate in position during its rest period. In this machine, all working parts inside are sealed from the outside, they can be disposed in any position, and oil will not leak in or out of the enclosure.

More specifically, an object of the invention is to provide an indexing unit which is simple in construction, economical to manufacture, and simple and efficient to use.

Another object of the invention is to provide an indexing unit having a fixed center plate and an indexing plate rotatable around the center plate.

Another object of the invention is to provide an indexing unit having a fixed center plate and an indexing plate concentric with the center plate and a fixed radial plate extending around the rotating indexing plate.

With the above and other objects in view, the present invention consists of the combination and arrangement of parts hereinafter more fully described, illustrated in the accompanying drawings and more particularly pointed out in the appended claim, it being understood that changes may be made in the form, size, proportions, and minor details of construction without departing from the spirit or sacrificing any of the advantages of the invention.

In the drawings:

Fig. 2 shows a broken away view of the actuating member;

Fig. 3 is a cross sectional view similar to Fig. 1 showing the indexing plate, outer radial plate, and the center fixed plate;

Fig. 4 is an enlarged view of the indexing plate and the blocking back; and

Fig. 5 shows a view of the roller plate and indexing roller.

Figure 1:
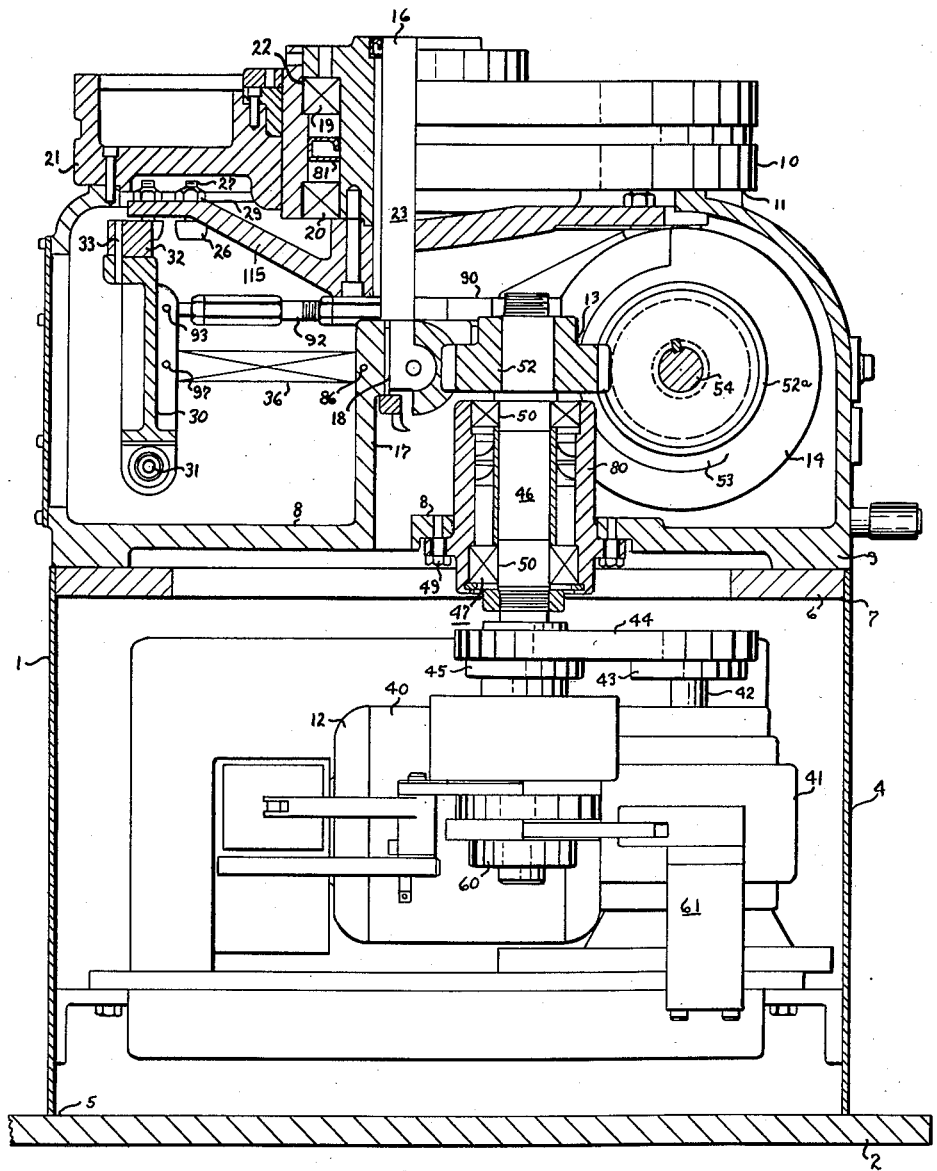
Fig. 1 is a cross sectional view of the indexing unit.

Now with more specific reference to the drawings, a machine is shown having a frame 1. The frame 1 is supported on the base 2 and has a cylindrical support member 4 attached thereto at 5 and extends outwardly and has a plate 6 attached to the cylindrical member 4 at 7. The plate 6 has the frame member 8 supported thereon at 9 and the plate 6 then extends upwardly to support the fixed outer bases 10 and 11. The frame 8 having an upwardly extending member 17 integral therewith supports the motor and drive assembly 12 which is geared into the reduction gear 13 and drives the cross over cam wheel 14.

On index plate 15 is supported on the frame 8 and the index plate 15 is rotatable therearound, the central shaft 16 being keyed to the upwardly extending member 17 by key 18. Bearings 19 and 20 are supported in the fixed radial support member 21 at 22. The support member 21 and the upwardly extending member 17 are, therefore, a part of the frame 8. The roller plate 115 has spaced rollers 26 pivoted on axles 27 which are inserted through the plate 115 and held thereto by nuts 29. A locking device made up of a lever 30 is swingably attached to the frame 8 at 31. The lever 30 has the wedge member 32 supported thereon by means of pins 33 and the wedge shaped end 32 is constrained to be urged between the rollers 26 by spring 36. A center plate 70 is an annular member having an opening at its center which receives the upper end of the shaft 16. Bolts 95 spaced around the center opening hold the center plate 70 to a flange 91 on the shaft 16. The index plate 15 is supported in spaced relation to the roller plate 115 and is attached thereto by a sleeve 63 which is concentric to the shaft 16 and receives the bearings 19 and 20. The bearings 19 and 20 are supported in the support member 21 and, therefore, on the frame 8.

A cam 90 is fixed to rotate with a shaft 46 and it engages the end of a link 92 remote from the pivotal end of the lever 30. The link 92 is pivoted to the lever 30 at 93 and the lever 30 is pivoted to the frame 8 at 31. The lever 30 is attached to the spring 36 at 97 and spring 36 urges lever 30 and wedge 32 attached thereto toward rollers 26. Spring 36 is attached to frame 8 at 8b. The slot 56 extends around the periphery of cam wheel 53 approximately ninety degrees thereof and the cam 90 is out of engagement with the end of the link 92 prior to the time rollers 26 engage the slot 56. Therefore, the wedge 32 does not oppose the rotation of the index plate 15.

The wedge 32 is moved out of engagement with the rollers 26 by link 92 which is actuated by cam 90 on shaft 46 as the cross over cam 14 rotates the index plate 15. That is, the wedge plate 32 is moved out from between the rollers 26 when the drive 12 commences to advance the index plate 15 and thereby releases the plate 15 during the time interval of its advance. The cross over cam wheel 14 is of the type familiar to those skilled in the art having the spiral slot 56 referred to above around the periphery. On each rotation of the cam wheel 14, another roller 26 enters the slot 56 at one end and moves along the slot 56 to the other side as the wheel 14 completes its rotation. This advances the roller plate 115 one position.

The motor drive 12 is made up of the motor 40 which operates the reduction gear 41 to drive the shaft 42 which has the V-pulley 43 thereon. The pulley 43 drives the V-belt 44 which operates the pulley 45. The pulley 45 drives through shaft 46 which has a bearing member 47 supported on the frame 8. The pulley 45 is connected to the shaft 46 through a one-revolution clutch 60 which is actuated by an actuating member 61 controlled by the operator. Mounting brackets 72 may be supported on frame 71 on which additional tools may be located. The bearings 50 support the shaft 46 and the shaft 46 has a gear 52 supported thereon at the end 51. The gear 52 engages the gear 52a on cam wheel 53 which is pivoted on the frame 8 by means of shaft 54; however, the wheel 53 could be driven by a worm gear or similar means. The cross over cam wheel 53 has peripheral spiral shaped slot 56 which is adapted to successively receive the rollers 26. The thickness of the wheel 53 at 57 is exactly equal to the distance between the rollers 26. Consequently, there is no backlash between the wheel 53 and the roller plate 15. Grease retainers 80 seal the shaft 46 against leakage and a grease seal 81 is provided to prevent leakage at bearings 19 and 20.

In use, a piece of work to be operated on can be supported on the center plate 70 and tools to operate the piece of work can be spread on the indexing plate 15.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

In an indexing machine comprising an index plate rotatably mounted on a support, means to rotate said index plate predetermined amounts at predetermined intervals, said means comprising spaced members circumferentially disposed on said index plate, cam member means operatively engaging said spaced members to move said index plate forward at predetermined intervals, a wedge plate pivotally mounted relative to said support and so arranged and constructed to pivot into the chordal space between said spaced members whereby said wedge plate positively engages said spaced members to hold said index plate from rotation, said wedge plate arranged and constructed to have its edges which engage the said spaced members convergent in a radial direction relative to the center of said index plate, the unengaged portion of said wedge plate having a width greater than the chordal spacing of said spaced members, and second cam member means operatively connected to said wedge plate such that said wedge plate is disengaged from said spaced members during the interval of rotation of said index plate.

References Cited in the file of this patent

UNITED STATES PATENTS

| | | |
|---|---|---|
| 215,810 | Eaton | May 27, 1879 |
| 646,287 | Hundhausen | Mar. 27, 1900 |
| 891,199 | Wheeler | June 16, 1908 |
| 1,231,062 | Pietsch et al. | June 26, 1917 |
| 2,011,488 | Swahnberg | Aug. 13, 1935 |
| 2,164,396 | Foster et al. | July 4, 1939 |
| 2,244,463 | Kingsbury et al. | June 3, 1941 |
| 2,395,803 | Bruckner et al. | Mar. 5, 1946 |
| 2,588,977 | Gartner et al. | Mar. 11, 1952 |
| 2,627,647 | Hautau | Feb. 10, 1953 |
| 2,645,981 | Hirvanen | July 21, 1953 |

FOREIGN PATENTS

| | | |
|---|---|---|
| 1,011,959 | France | Apr. 9, 1952 |

OTHER REFERENCES

Bulletin 12, Standard Tool and Mfg. Co., Mar. 12, 1953, Arlington, New Jersey.